US012779787B2

(12) United States Patent
Lee et al.

(10) Patent No.: US 12,779,787 B2
(45) Date of Patent: Nov. 3, 2026

(54) METHOD FOR CONTROLLING A 3D PRINTING SYSTEM

(71) Applicant: Research & Business Foundation Sungkyunkwan University, Suwon-si (KR)

(72) Inventors: Brian Jun Lee, Suwon-si (KR); Minsung Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 126 days.

(21) Appl. No.: 18/755,102

(22) Filed: Jun. 26, 2024

(65) Prior Publication Data

US 2025/0001698 A1 Jan. 2, 2025

(30) Foreign Application Priority Data

Jun. 30, 2023 (KR) ........................ 10-2023-0084721

(51) Int. Cl.

| | |
|---|---|
| ***B29C 64/393*** | (2017.01) |
| ***B29C 64/129*** | (2017.01) |
| ***B29C 64/277*** | (2017.01) |
| ***B33Y 30/00*** | (2015.01) |
| ***B33Y 50/02*** | (2015.01) |

(52) U.S. Cl.

CPC .......... *B29C 64/393* (2017.08); *B29C 64/129* (2017.08); *B29C 64/277* (2017.08); *B33Y 30/00* (2014.12); *B33Y 50/02* (2014.12)

(58) Field of Classification Search

CPC ....... B33Y 30/00; B33Y 10/00; B29C 64/171; B29C 64/182; B29C 64/277

See application file for complete search history.

(56) References Cited

U.S. PATENT DOCUMENTS

| | | | |
|---|---|---|---|
| 2014/0198365 | A1 | 7/2014 | Li et al. |
| 2022/0258422 | A1 | 8/2022 | Wynne et al. |

FOREIGN PATENT DOCUMENTS

| | | | | |
|---|---|---|---|---|
| CN | 112549537 | B | | 7/2022 |
| KR | 101612254 | | * | 4/2016 |
| KR | 10-1966333 | B1 | | 4/2019 |
| KR | 10-2031070 | B1 | | 10/2019 |

* cited by examiner

*Primary Examiner* — Edmund H Lee

(57) ABSTRACT

The present invention relates to a 3D printing system and method for controlling the same, the method comprising a 3D printer comprising a single UV projector for irradiating UV light, a plurality of beam splitters for dispersing the irradiated UV light, a plurality of mirrors for reflecting the dispersed UV light, and a shutter that is open or closed according to the number of outputs that are to be simultaneously output, and a workstation for performing pre-processing and control for 3D printing, the method comprises receiving, by the workstation, the number of outputs that are to be simultaneously output in parallel, opening, by the 3D printer, the shutter according to the number of outputs, setting, by the workstation, a pattern image, adjusting, by the workstation, a gray scale level for each pixel with respect to the set pattern image and 3D printing, by the 3D printer, the pattern image of which the amount of light is adjusted through the gray scale level.

10 Claims, 13 Drawing Sheets

METHOD FOR CONTROLLING A 3D PRINTING SYSTEM

CROSS-REFERENCE TO RELATED APPLICATIONS

The application claims the benefit under 35 USC § 119(a) of Korean Patent Application No. 10-2023-0084721, filed on Jun. 30, 2023, in the Korean Intellectual Property Office, the entire disclosure of which is incorporated herein by reference for all purposes.

BACKGROUND

1. Technical Field

The present invention relates to a 3D printing system and a method for controlling the same.

2. Background Technology of the Invention 3D printing has emerged as an innovative alternative as the current flow of processing is focused on speeding, precision, and customization.

In particular, projection-based 3D printers, which cure photocurable materials one layer by one through UV light from a UV projector, can produce complex structures due to high precision.

However, there is a problem that it is difficult to apply it in actual industrial sites due to limitations such as production speed and output area.

In the case of production speed, conventional projection-based 3D printers can obtain only one output with one output, which has a problem in that optical expansion of light is impossible due to the fixed focal length of the UV projector.

In addition, a large number of pixels composed of DMD chips are present inside the UV projector, and the pixels form an image by reflecting light one by one, and although an output area may be expanded by combination with an appropriate lens, since the number of pixels is fixed, there is a problem in that a resolution is lowered.

In order to perform mass production and large-area output of a projection-based 3D printer, the number of UV projectors has been increased, but the manufacturing cost is too large to be practically impossible, and when movement is given to optical components such as a UV projector, there are problems in that accuracy is deteriorated in high-resolution output and an output speed is reduced at a limited moving speed.

SUMMARY

An object of the present invention is to provide a 3D printing system and a method for controlling the same, which 3D print a plurality of pattern images to be output through one UV projector, a plurality of beam splitters, and a plurality of mirrors.

In order to solve the above-described problems, a 3D printing system and a method for controlling the same are provided.

A method for controlling a 3D printing system comprising a 3D printer comprising a single UV projector for irradiating UV light, a plurality of beam splitters for dispersing the irradiated UV light, a plurality of mirrors for reflecting the dispersed UV light, and a shutter that is open or closed according to the number of outputs that are to be simultaneously output, and a workstation for performing pre-processing and control for 3D printing, the method comprises receiving, by the workstation, the number of outputs that are to be simultaneously output in parallel, opening, by the 3D printer, the shutter according to the number of outputs, setting, by the workstation, a pattern image, adjusting, by the workstation, a gray scale level for each pixel with respect to the set pattern image and 3D printing, by the 3D printer, the pattern image of which the amount of light is adjusted through the gray scale level.

The adjusting of the gray scale level for each pixel comprises allocating, by the workstation, a relative value according to an amount of UV light, which is previously measured experimental data, for each of a plurality of regions in one section and adjusting, by the workstation, the gray scale level based on the allocated relative value.

The setting of the pattern image comprises receiving, by the workstation, a Layer thickness of an output and determining, by the workstation, the number of pattern images for each output.

The determining the number of pattern images for each output determines, by the workstation, the number of pattern images for each output using a height of the output and a pre-input Layer thickness.

The method for controlling a 3D printing system further comprises rearranging, by the workstation, the pattern images according to a pattern order of the output including the plurality of pattern images.

The rearranging the pattern images rearrange, by the workstation, the first pattern image for each output to the n-th pattern image for each output in order.

The 3D printing comprises 3D printing, by the 3D printer, the pattern image of which the amount of light is adjusted by sequentially opening and closing shutters in accordance with the rearranged pattern order.

The method for controlling a 3D printing system further comprises calculating, by the workstation, the number of divisions based on the output area.

The calculating of the number of divisions comprises calculating, by the workstation, the number of horizontal divisions using the number of horizontal pixels of the output area and the number of output horizontal pixels of the section or calculating, by the workstation, the number of vertical divisions using the number of vertical pixels of the output area and the number of output vertical pixels of the section.

The 3D printing comprises 3D printing, by the 3D printer, the pattern image of which the amount of light is adjusted by sequentially opening and closing shutters in accordance with the number of divisions of one pattern image.

A 3D printing system comprises a 3D printer comprising a single UV projector to irradiate a single UV light, a tube lens, a plurality of beam splitters to disperse the irradiated UV light, a plurality of mirrors to reflect the dispersed UV light, an objective lens, an ND filter to equalize an amount of the UV light and a shutter to be opened or closed in accordance with a number of outputs to be simultaneously output and a workstation comprising an input processor to receive the number of outputs to be simultaneously output in parallel and a controller to set a pattern image and to adjust a gray scale level of each pixel with respect to the set pattern image.

The controller allocates a relative value to each of the plurality of regions in one section in accordance with the amount of UV light, which is previously measured experimental data, and adjusts the gray scale level based on the allocated relative value.

The input processor further receives a Layer thickness of the output, and the controller determines the number of pattern images for each output to be output using the height of the output and the Layer thickness.

The controller rearranges the pattern images according to a pattern order of the output including the plurality of pattern images.

The controller rearranges the first pattern image for each output to the n-th pattern image for each output in order.

The 3D printer opens and closes a shutter sequentially according to the rearranged pattern order, and 3D prints the pattern image of which the amount of light is adjusted through the gray scale level.

The controller calculates the number of divisions based on an output area.

The controller calculates the number of horizontal divisions using the number of horizontal pixels of the output area and the number of output horizontal pixels of the section.

The controller calculates the number of vertical divisions using the number of vertical pixels of the output area and the number of output vertical pixels of the section.

The 3D printer 3D prints the pattern image of which amount of light is adjusted through the gray scale level while shutters sequentially open and close in accordance with the number of divisions of one pattern image.

According to the above-described 3D printing system and the method for controlling the same, since UV linearly radiated from the UV projector passes between the tube lens and the objective lens in parallel, an image formed on the pattern image may have the same resolution, and a plurality of beam splitters and mirrors may be installed between the objective lens and the tube lens to simultaneously illuminate the same UV pattern image, thereby producing the same output.

Further, the UV pattern on which light is projected and a shutter are quickly changed to sequentially output various patterns, thereby enabling customized mass production. Further, since the distance between the beam splitter and the mirror is precisely provided, parallel UV patterns of neighbors come into contact with each other so as to output large areas.

DETAILED DESCRIPTION

Figure 1:
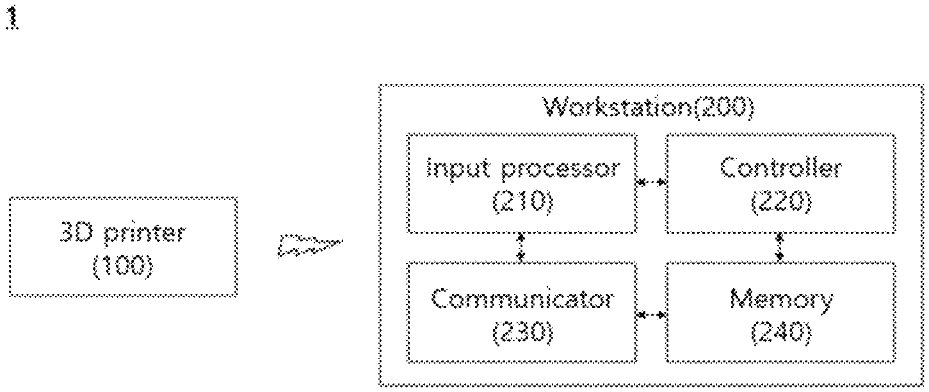
FIG. 1 is a block diagram for explaining a 3D printing system according to an embodiment of the present invention.

The advantages and features of the present invention, as well as the methods for achieving them, will become apparent from the embodiments described with reference to the accompanying drawings. However, it should be understood that the present invention can be implemented in various forms other than those disclosed in the embodiments provided below. The embodiments disclosed herein are merely to fully enable disclosure of the invention and to provide a complete understanding of the scope of the invention to those skilled in the art to which the invention pertains, as defined by the claims.

Brief descriptions of the terms used in this specification are provided, and specific explanations of the present invention will follow.

The terminology used in the present invention has been selected based on commonly used terms in the field, considering the functions of the invention. However, these terms may vary depending on the intent of practitioners in the field, precedents, emergence of new technologies, and so forth. Additionally, some terms may have been arbitrarily chosen by the applicant, and in such cases, their meanings will be detailed in the description of the relevant invention. Therefore, the terms used in the present invention should be defined not merely as names of terms, but based on their meanings and the content spanning the entirety of the invention.

Throughout the specification, when a part is described as "including" certain components, this means it may include additional components unless specifically stated otherwise. Furthermore, terms such as "part," "module," "unit," and similar terms refer to units that perform at least one function or operation, and may be implemented as hardware components such as software, FPGA, or ASIC, or as a combination of software and hardware. However, the terms "part," "module," "unit," etc., are not limited to either software or hardware. They may also be configured as addressable storage media, designed to replay one or more processors, or to configure them. Thus, for example, terms such as "part," "module," "unit," etc., include software components, object-oriented software components, class components, and task components, as well as processes, functions, attributes, procedures, subroutines, segments of program code, drivers, firmware, microcode, circuits, data, databases, data structures, tables, arrays, and variables.

Below, with reference to the attached drawings, embodiments of the present invention are described in detail to enable those skilled in the art to easily carry out the invention in the field to which it pertains. Irrelevant parts are omitted from the description in order to clearly explain the invention in the drawings.

Terms including ordinals such as "first," "second," etc., may be used to describe various components, but these terms do not limit the components. The terms are used solely for the purpose of distinguishing one component from another.

For example, within the scope of the present invention, the first component may be named as the second component as long as it does not exceed the scope of the claims of the invention. The term "and/or" includes combinations of multiple related items or any one of multiple related items.

Hereinafter, a 3D printing system according to an embodiment of the present invention will be described with reference to the drawings.

Figure 2:
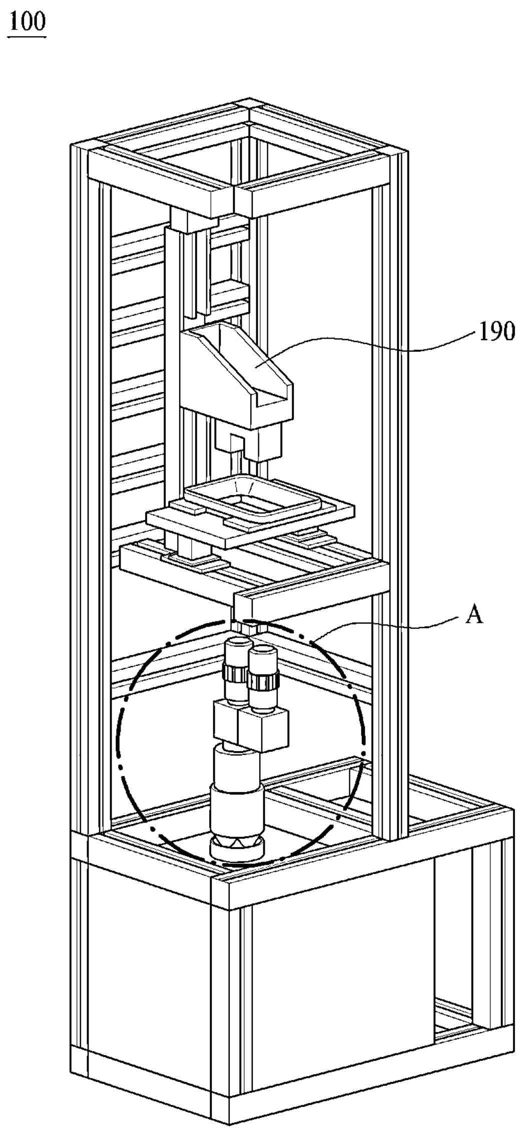
FIG. 2 is a view for explaining a 3D printer.
Figure 3:
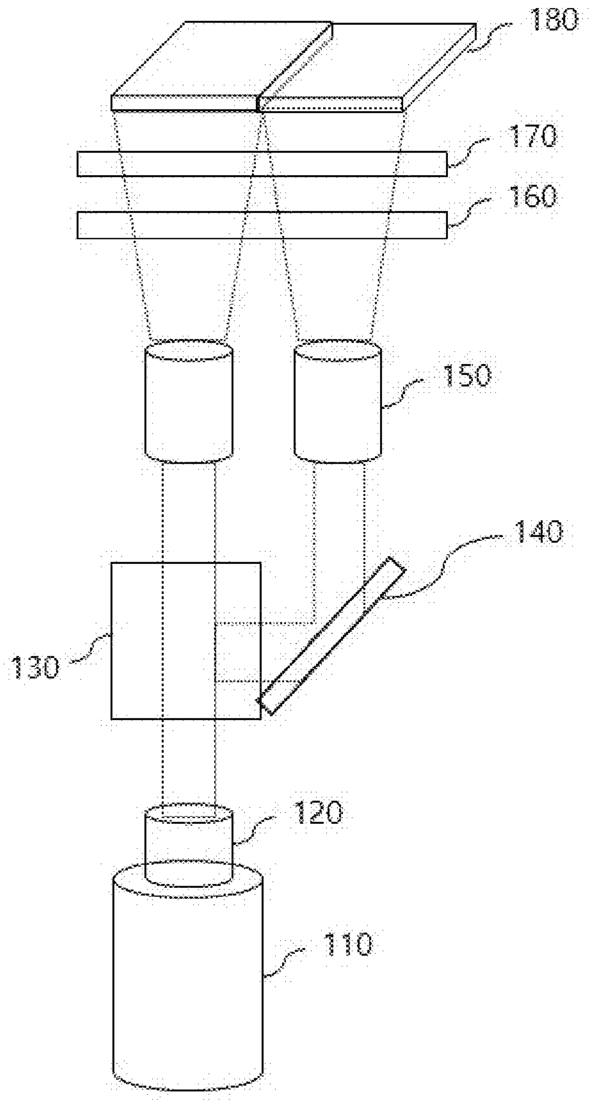
FIG. 3 is a view for explaining the configuration of a 3D printer.

FIG. 1 is a block diagram for explaining a 3D printing system according to an embodiment of the present invention, FIG. 2 is a view for explaining a 3D printer, and FIG. 3 is a view for explaining the configuration of a 3D printer.

As shown in FIG. 1, the 3D printing system 1 includes a 3D printer 100 and a workstation 200.

The 3D printer 100 and the workstation 200 may be connected to each other in a wired or wireless manner to transmit and receive data.

The 3D printer 100 opens shutters as many as the number of outputs according to the open signal transmitted from the workstation 200.

For example, when the number of shutters is five, the workstation 200 may transmit the open signal to the 3D printer 100 as many as the number of outputs input from the user, and the 3D printer 100 may open three shutters and block the remaining two shutters.

As shown in FIGS. 2 and 3, the 3D printer 100 includes a UV projector 110, a tube lens 120, a beam splitter 130, a mirror 140, an objective lens 150, a neutral density filter (ND filter) 160, a shutter 170, a pattern image 180, and a platform 190 connected to a linear actuator moving in a z-axis.

More specifically, FIG. 3 is an enlarged view of "A" of FIG. 2, and the 3D printer 100 may include one UV projector 110, one tube lens 120, a plurality of beam splitters 130, a plurality of mirrors 140, a plurality of objective lenses 150, a plurality of ND filters 160, a plurality of shutters 170, and a plurality of pattern images 180.

The UV projector 110 irradiates one UV ray.

The UV projector 110 may be a Light engine.

The tube lens 120 plays a role of emitting light in parallel and plays a role of making the resolutions of parallel output materials the same.

The beam splitter 130 may disperse the irradiated UV light.

The mirror 140 may reflect the UV light scattered by the beam splitter 130 toward the objective lens 150.

The objective lens 150 serves to image light emitted parallel from the tube lens 120.

That is, in the present invention, both the tube lens 120 and the objective lens 150 are used, so that the light UV emitted from the UV projector 110 can be made parallel and the resolution of the outputs can be made uniform.

The ND filter 160 is fixed at all times, and may control the amount of light passing for each UV wavelength.

At this time, the amount of UV light can vary according to the pre-determined number of the ND filter 160.

In addition, the ND filter 160 serves to adjust the total amount of UV light of the irradiated pattern image equally.

Although FIG. 3 illustrates that the ND filter 160 is positioned at a lower end of the shutter 170, the ND filter 160 may be positioned at an upper end of the shutter 170.

The ND filter 160 and the shutter 170 may be integrally formed.

The shutter 170 can open or close in response to the number of outputs to be simultaneously produced.

The pattern image 180 may be implemented in different patterns.

Figure 4:
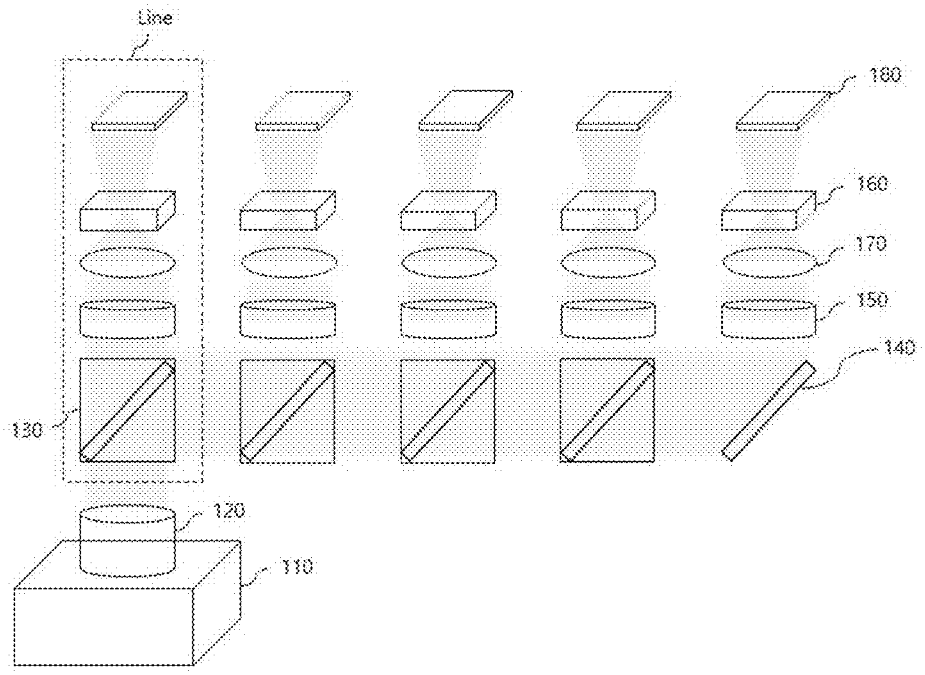
FIG. 4 is a diagram illustrating a simultaneous parallel output according to an embodiment of the present invention.

FIG. 4 is a diagram illustrating a simultaneous parallel output according to an embodiment of the present invention.

As shown in FIG. 4, when the UV projector 110 irradiates UV light, the UV light passes through the tube lens 120 and is dispersed by the beam splitter 130, and the dispersed UV light passes through the objective lens 150 by the mirror 140 adjacent thereto.

The amount of UV light passing through the objective lens 150 is adjusted by the ND filter 160, and the 3D printer 100 may perform 3D printing by irradiating the pattern image 180 with the UV light of which the amount is adjusted according to opening or closing of the shutter 170.

In this case, the ND filter 160 may be positioned at an upper end of the shutter 170.

With such a configuration, the 3D printer 100 may perform 3D printing by irradiating UV rays to a plurality of identical pattern images simultaneously in parallel.

Figure 5:
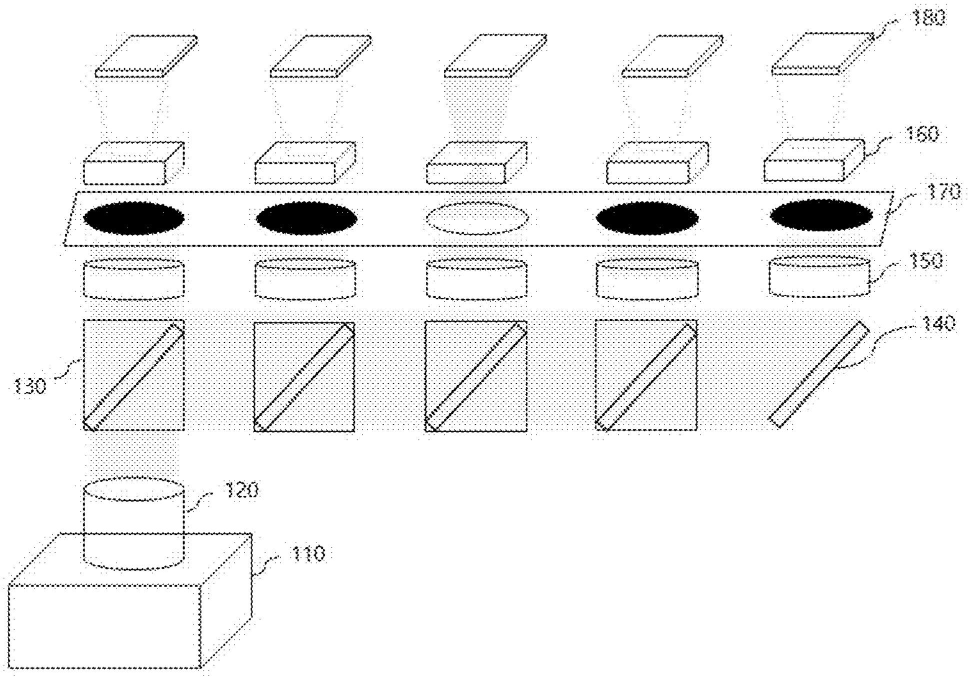
FIG. 5 is a diagram for describing an output for customized mass production according to another embodiment of the present invention.

FIG. 5 is a diagram for describing an output for customized mass production according to another embodiment of the present invention.

As shown in FIG. 5, when the UV projector 110 irradiates UV light, the UV light passes through the tube lens 120 and is dispersed by the plurality of beam splitters 130, and the dispersed UV light passes through the objective lens 150 by the plurality of neighboring mirrors 140.

In this case, unlike FIG. 4, a mechanical shutter 170 may be installed at the entrance of the objective lens 150.

The UV light passing through the objective lens 150 passes through the shutter 170 according to opening and closing of the shutter, the amount of the UV light is uniformly adjusted by the ND filter 160, and the 3D printer 100 may perform 3D printing by irradiating the UV light of which the amount is adjusted to different pattern images 180.

In this way, the 3D printer 100 may sequentially perform 3D printing by irradiating UV to various pattern images 190 to be output through opening or closing of the shutter 170.

Figure 6:
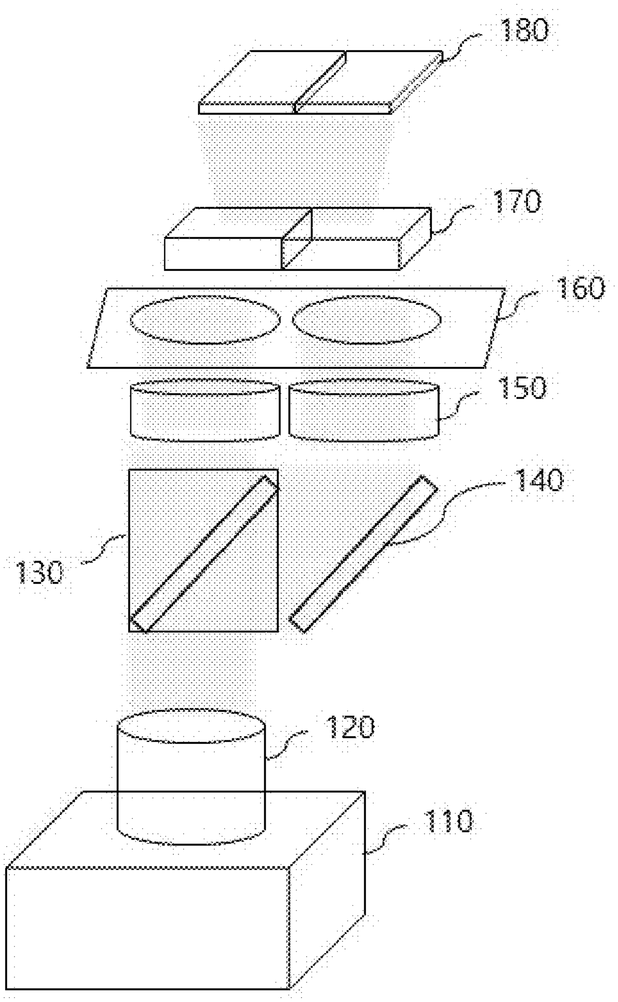
FIG. 6 is a view for describing a high resolution-large area output according to another embodiment of the present invention.

FIG. 6 is a view for describing a high resolution-large area output according to another embodiment of the present invention.

As shown in FIG. 6, the configuration and order of the 3D printer 100 may be the same as those of FIG. 5, and the distances between the plurality of beam splitters 130, the plurality of mirrors 140, the plurality of objective lenses 150, the plurality of ND filters 160, and the plurality of shutters 170 that neighbor each other may be shorter than the reference distance.

According to another embodiment of the present invention, the number of the beam splitter 130, the mirror 140, the objective lens 150, the ND filter 160, and the shutter 170 is two, but two or more may be implemented.

In this way, since the neighboring pattern images 180 are in contact with each other, the 3D printer 100 may irradiate UV light to the pattern image 180 to perform 3D printing on a large area.

The configuration and order of the 3D printer 100 of FIG. 6 have already been described with reference to FIG. 5, and thus a redundant description will be omitted.

Referring back to FIG. 1, the workstation 200 may include an input processor 210, a controller 220, a communicator 230, and a memory 240.

The workstation 200 may include, for example, a Central Processing Unit (CPU), a Graphic Processing Unit (GPU), a Micro Controller Unit (MCU), an Application Processor (AP), an Electronic Controlling Unit (ECU), and/or at least one electronic device capable of performing various operations and control processing. These devices may be implemented, for example, by using one or two or more semiconductor chips, circuits, or related components alone or in combination.

Specifically, the workstation 200 may be implemented in various forms, such as a personal computer (PC) such as a notebook computer or a mobile device such as a smart pad and a smartphone, as a device capable of transmitting and receiving information by accessing a network in a wired or wireless manner.

The input processor 210 receives the number of outputs to be simultaneously output in parallel from a user.

In this case, the number of outputs means the number of outputs to be simultaneously output in parallel in the 3D printer 100.

In addition, the input processor 210 receives 3D modeling data.

In this case, the 3D modeling data may include an STL file.

Also, the input processor 210 may receive previously experimented light intensity data for each pixel through a UV camera for adjusting a gray scale level.

In addition, the input processor 210 may receive an Layer Thickness of an output to be output.

In this case, "Layer Thickness" is preset and input by the user and represents the thickness of the pattern image.

The input processor 210 may receive Layer thickness of 10 micron or more.

According to an embodiment, the input processor 210 may be integrally formed with the communicator 230 or may be physically separable. The input processor 210 may be connected to a terminal such as a PC, a notebook computer, a mobile device, or the like, and may be received from a user through the terminal, and may include, but is not limited to, a keyboard, a mouse, a tablet, a touch screen, a touch pad, a track ball, a track pad, a scanner device, an image photographing module, an ultrasonic scanner, a motion detection sensor, a vibration sensor, a light receiving sensor, a pressure reducing sensor, a proximity sensor, and/or a data input/output terminal.

The controller 220 may set the pattern image in advance.

Here, the pattern image may be a layer of an output that is 3D printed.

The controller 220 adjusts a gray scale level for each pixel with respect to a preset pattern image.

In this case, the controller 220 may adjust the gray scale level for each pixel of the pattern image based on the experimental data received from the input processor 210.

Describing experimental data, the UV projector 100 irradiates UV to a pattern image for an experiment, and the 3D printer 100 3D prints the irradiated pattern image.

In addition, one irradiated pattern image may be divided into a plurality of areas and set, and a UV light amount measurer, which is an external device, may measure the amount of UV light for each area of the output area.

In this case, the size of the area may be determined according to the SPEC of the UV light intensity meter.

At this time, the measured amount of UV light for each area is defined as experimental data.

Figure 7:
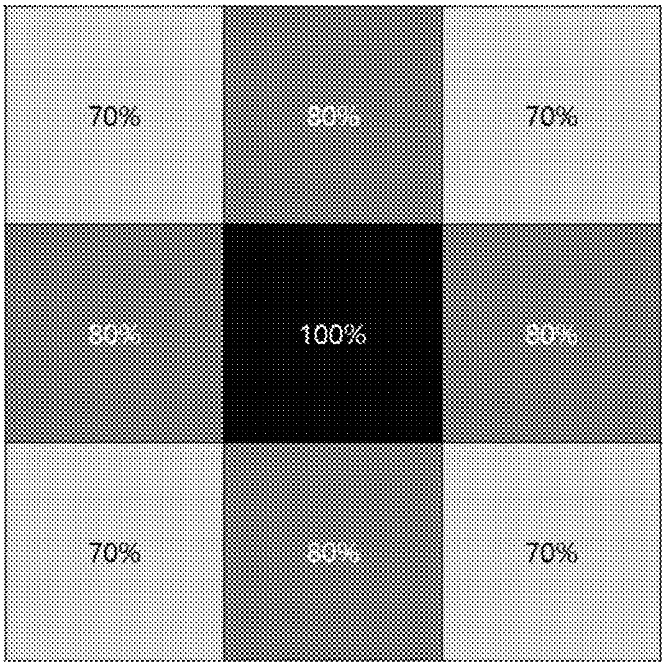
FIG. 7 is a diagram for describing an amount of light.

FIG. 7 is a diagram for describing an amount of light.

More specifically, since the intensity of light (light amount) is weakened toward the edge of the light UV and the intensity of light at the center and the edge of the image is different, as shown in FIG. 7, the controller 220 may allocate a relative value to each of the plurality of regions included in one pattern image in response to the intensity of light of UV which is previously measured experimental data.

The controller 220 may allocate the area having the largest amount of UV light as 100%, and allocate the remaining area as a relative value.

For example, since the region at the center of the entire area is the portion having the largest amount of UV light, the controller 220 may allocate 100%, and allocate the remaining region other than the center to 60% to 90%.

The controller 220 may adjust the gray scale level for each region based on the allocated relative value.

In this case, a higher gray scale level may represent a darker color.

The controller 220 may adjust the gray scale level to be relatively high as the light amount of UV is high with respect to four areas including edge corners to which the light amount of UV is allocated as 70%, four areas including upper and lower ends and left and right sides to which the light amount of UV is allocated as 80%, and a central area to which the light amount of UV is allocated as 100%.

That is, the controller 220 may adjust the color to a dark color as the amount of allocated UV light increases.

The controller 220 may set the allocated relative value to a dark color based on the gray scale level.

Accordingly, the controller 220 may adjust an optimal gray scale level for each output number based on the allocated ratio and apply the adjusted gray scale level to each area.

In addition, the controller 220 may designate a color of a gray scale level of each pixel in the stored pattern image file.

In this case, the gray scale-level color designation criteria may be based on the amount of UV light measured in advance through experiments.

As described above, the images output in parallel may be adjusted to have the same amount of light through a total of two UV light amount controls including the ND filter 160 and the gray scale level adjustment for each pixel.

The communicator 230 transmits an open signal for opening the shutter 170 to the 3D printer 100 in response to the number of received outputs.

The communicator 230 transmits a printing signal for 3D printing a pattern image with the adjusted amount of UV light to the 3D printer 100.

The communicator 230 may include both wired and wireless communication networks. For example, a wired/wireless Internet network may be used or linked as a communication network. Here, the wired network includes an Internet network such as a cable network or a public switched telephone network (PSTN), and the wireless network includes CDMA, WCDMA, GSM, Evolved Packet Core (EPC), Long Term Evolution (LTE), Wibro network, 5G communication network, and the like. Of course, the communicator 230 according to an embodiment of the present disclosure is not limited thereto, and may be used as an access network of a next-generation mobile communication system to be implemented in the future, for example, a cloud computing network under a cloud computing environment, a 5G network, or the like. For example, when the communicator 230 is a wired communication network, an access point in the communication network may access an exchange station of a telephone station, and the like, but when the communicator 230 is a wireless communication network, the access point may access an SGSN or a Gateway GPRS Support Node (GGSN) operated by a communication company to process data, or may access various repeaters such as a Base Station Transmission (BTS), a NodeB, a e-NodeB, and the like to process data.

The memory 240 may store the set pattern image as a file.

The memory 240 may store a plurality of pattern images included in an output to be output in the form of folders.

The memory 240 may include at least one of a main memory device and an auxiliary memory device. The main memory device may be implemented using a semiconductor storage medium such as, for example, ROM and/or RAM, and the auxiliary memory device may be implemented based on a device capable of permanently or semi-permanently storing data, such as a flash memory device (a Solid State Drive (SSD), etc.), a Secure Digital (SD) card, a Hard Disc Drive (HDD), a compact disk, a Digital Versatile Disk (DVD), a laser disk, etc.

Hereinafter, a method for controlling a 3D printing system according to an embodiment of the present invention will be described with reference to the drawings.

Figure 8:
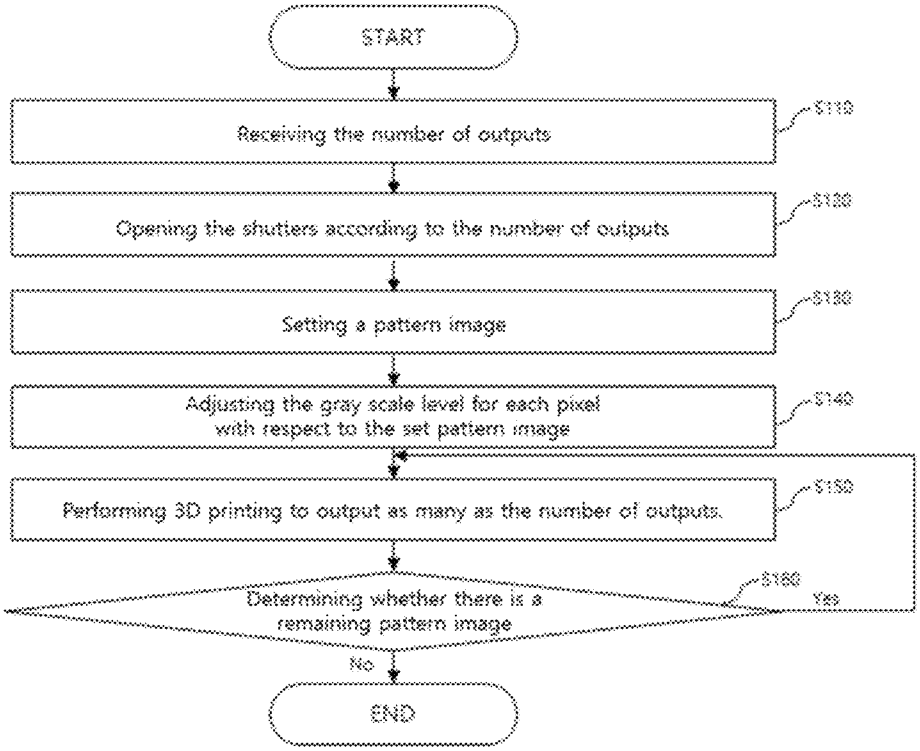
FIG. 8 is a flowchart illustrating a simultaneous parallel output method according to an embodiment of the present invention.

FIG. 8 is a flowchart illustrating a simultaneous parallel output method according to an embodiment of the present invention.

The input processor 210 receives the number of outputs to be simultaneously output in parallel from a user (S110).

In this case, the input processor 210 may receive the type and number of beam splitters of the 3D printer 100 as the number of outputs.

For example, if a beam splitter that passes 50% and reflects 50% is used, the 3D printer 100 can output two parallel outputs, but if a beam splitter that passes 10% and reflects 90% is used, the 3D printer 100 can output a plurality of parallel outputs.

Accordingly, the input processor 210 may receive the type and number of beam splitters of the 3D printer 100.

In addition, the input processor 210 may receive an Layer Thickness of an output to be output.

Since step S110 has already been described in the input processor 210 of FIG. 1, a duplicate description will be omitted.

The communicator 230 may transmit an open signal for opening the shutter 170 as many as the number of received outputs to the 3D printer 100.

The 3D printer 100 opens the shutters 170 according to the number of outputs through the transmitted open10 signal (S120).

As shown in FIG. 4, when the number of outputs received by the input processor 210 is five, the 3D printer 100 may open all of the five shutters 170 according to the number of outputs by the opening signal transmitted from the communicator 230.

The controller 220 sets a pattern image to be output (S130).

The controller 220 may perform a slicing process in response to the Layer Thickness received from the input processor 110 to set the number of pattern images.

In this case, a plurality of pattern images according to the number of pattern images may be stored in the memory 240 in the form of a folder.

The controller 220 may adjust the gray scale level for each pixel with respect to the set pattern image (S140).

The controller 220 may allocate the light amount of UV for each area of the pattern image as a relative value based on experimental data that has been previously tested, adjust the gray scale level according to the allocated relative value, and apply the adjusted gray scale level to each area.

Since step S140 has already been described in the controller 220 of FIG. 1 and FIG. 7, a redundant explanation will be omitted.

The communicator 230 may transmit a printing signal to the 3D printer 100 so that 3D printing can be performed based on the pattern image of which the light amount is adjusted through the gray scale level.

The 3D printer 100 performs 3D printing based on the pattern images obtained by adjusting the amount of UV light emitted from the UV projector 110 (S150).

In this case, the 3D printer 100 may perform 3D printing according to the number of pattern images determined according to a preset Layer Thickness.

The 3D printer 100 may perform 3D printing so that the pattern image may be output as many times as the number of outputs input whenever the UV projector 110 irradiates the pattern image.

In addition, the 3D printer 100 may perform 3D printing on all of the plurality of pattern images stored in the folder in order.

At this time, the platform ascends by Layer Thickness output from the 3D printer 100.

The controller 220 determines whether there is a remaining pattern image (S160).

The controller 220 may recognize that 3D printing is completed when a plurality of pattern images stored in the folder do not remain, and may continue 3D printing when a plurality of pattern images stored in the folder remain.

That is, as shown in FIG. 6, the 3D printer 100 may simultaneously perform 3D printing in parallel in response to the number of outputs input from the user.

Figure 9:
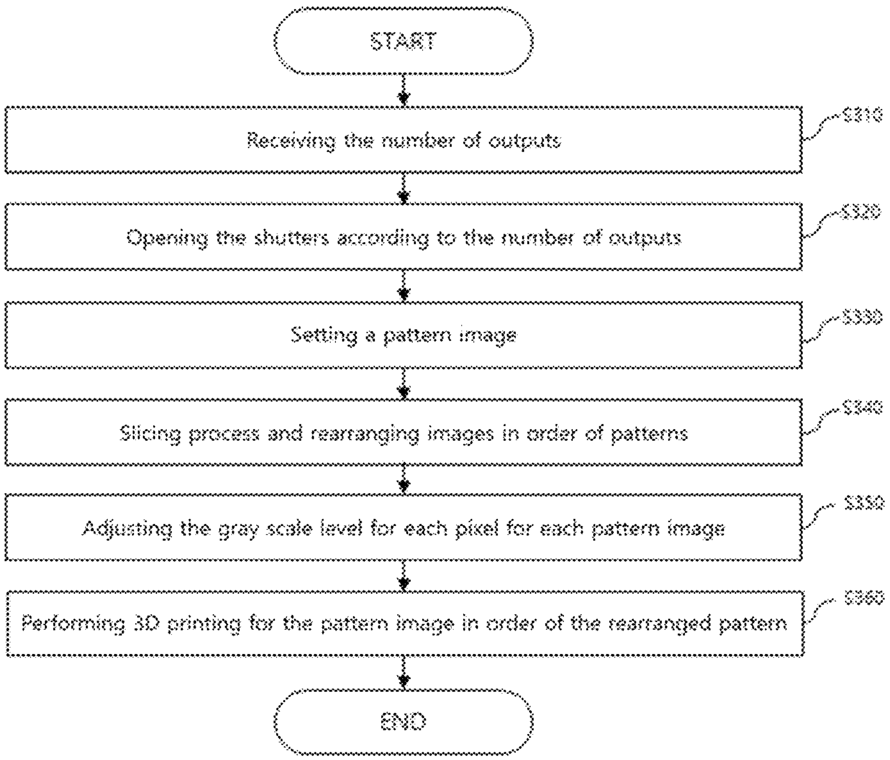
FIG. 9 is a flowchart illustrating an output method for customized mass production according to another embodiment of the present invention.

FIG. 9 is a flowchart illustrating an output method for customized mass production according to another embodiment of the present invention.

The input processor 210 receives the number of outputs to be simultaneously output in parallel from a user (S210).

Since step S210 has already been described in the input processor 210 of FIG. 1, a duplicate description will be omitted.

The communicator 230 may transmit an open signal for opening the shutter 170 as many as the number of received outputs to the 3D printer 100.

The 3D printer 100 opens the shutters 170 according to the number of outputs by the open signal (S220).

Step S220 has already been described in step S120 of FIG. 8, and thus a redundant explanation thereof will be omitted.

The controller 220 sets a pattern image to be output (S230).

More specifically, for example, when three different outputs are to be 3D printed, the controller 220 may perform the slicing process in response to the Layer thickness of each output received from the input processor 210.

In this case, the output represents a 3D modeled file to be output.

The controller 220 may determine the number of pattern images for each output to be output through Equation 1 below.

$$\text{Number of pattern images for each output} = \text{output height/Layer thickness} \quad \text{[Equation 1]}$$

At this time, the output height is predetermined by the user.

That is, when slicing is started, the controller 220 may determine the number of pattern images for each output using the height and Layer thickness of the output.

In this case, the controller 220 may generate a pattern image for 3D printing through a slicing process.

The sliced pattern images may be stored in the memory 240.

In a state in which the number of pattern images for each output is determined, the controller 220 may rearrange a plurality of pattern images for each output in one folder in the order of patterns (S240).

More specifically, the controller 220 controls the pattern order in one folder to be a first pattern image of the first output folder, a first pattern image of the second output folder, and a first pattern image of the third output folder . . . the n-th pattern image of the first output folder, the n-th pattern image of the second output folder, and the n-th pattern image of the third output folder may be rearranged in this order.

For example, if there are 10 pattern images (1-1~1-10) included in the first output folder, 15 pattern images (2-1~2-15) included in the second output folder, and 15 pattern images (3-1~3-15) included in the third output folder, the pattern order of rearrangement in one folder may be [(1-1)-(2-1)-(3-1)] . . . [(1-10)-(2-10)-(3-10)]-[(2-11)-(3-11)] . . . [(2-15)-(3-15)]

That is, the controller 220 may rearrange the first pattern image for each output to the n-th pattern image for each output in order.

In this way, the controller 220 may rearrange the pattern order for sequentially outputting parallel patterns in one folder.

The controller 220 may adjust the gray scale level for each pixel for each pattern image (S250).

Since step S250 has already been described in the control unit 220 of FIG. 1 and FIG. 7, a redundant explanation thereof will be omitted.

The communicator 230 transmits a printing signal for 3D printing the pattern image to the 3D printer 100.

The 3D printer 100 performs 3D printing for the pattern image in the order of the rearranged pattern (S260).

For example, a total of three irradiation processes are required for the pattern image of [(1-1)-(2-1)-(3-1)] which is the rearranged pattern order, and the 3D printer 100 may output three different first layers by sequentially opening and closing the shutter 170 according to the pattern irradiation position.

In this case, the platform is raised by the pre-input Layer thickness and since the number of pattern images of the first output folder is 10, the 3D printer 100 repeats 3D printing up to the 10th layer.

In other words, since the first folder includes 10 pattern images, the 3D printer 100 performs 3D printing in order from the first to tenth pattern images existing in the folder according to the rearranged pattern in one Line of the five Lines of FIG. 4.

When the 3D printing is completed up to the 10th layer, all of the first output is in a state in which the output is completed, the communicator 230 transmits a close signal for blocking the shutter of the first printout to the 3D printer 100, and the 3D printer 100 may block the shutter of the first output and continue to perform the 3D printing so that up to the 15th layer of the second output and the third output are output.

That is, the 3D printer 100 may sequentially open and close the shutter 170 according to the rearranged pattern order, and irradiate UV light to the pattern image to perform 3D printing.

Figure 10:
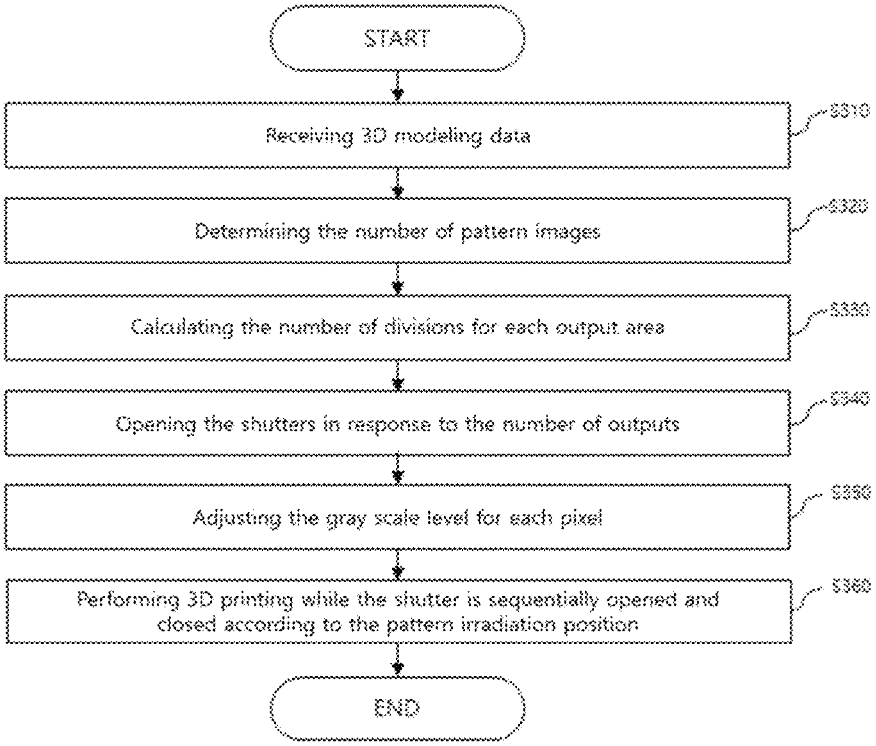
FIG. 10 is a flowchart illustrating a high resolution-large area output method according to another embodiment of the present invention.

FIG. 10 is a flowchart illustrating a high resolution-large area output method according to another embodiment of the present invention.

The input processor 210 receives 3D modeling data (S310).

In this case, the 3D modeling data may include an STL file.

In addition, the input processor 210 may receive a Layer Thickness of an output to be output.

In this case, the input processor 210 may receive Layer thickness of 10 micron or more.

The controller 220 may start the slicing process and determine the number of pattern images for each output through Equation 1 using the Layer thickness of each output received from the input processor 210 (S320).

Step S320 has already been described in step S230 of FIG. 8, and thus a redundant explanation thereof will be omitted.

The controller 220 calculates the number of divisions for each output area (S330).

In more detail, the controller 220 may calculate the number of divisions based on the output area.

The controller 220 may calculate the number of horizontal divisions through Equation 2 below.

$$\text{Number of horizontal divisions} = \left(\text{Number of horizontal pixels of an output area}/\text{Number of output horizontal pixels of one section}\right) + 1 \text{ (Number of decimal points is all discarded)} \quad \text{[Equation 2]}$$

The control unit 220 may calculate the number of vertical divisions through Equation 3 below.

$$\text{Number of vertical divisions} = \left(\text{Number of vertical pixels of an output area}/\text{Number of vertical pixels of an output of one section}\right) + 1 \text{ (Truncate all decimal places)} \quad \text{[Equation 3]}$$

In this case, a value obtained by multiplying the number of horizontal divisions by the number of vertical divisions is the total number of divisions.

If the number of horizontal divisions or the number of vertical divisions is greater than the number of horizontal and vertical parallel outputs set in the printer, the controller 220 may provide a notification that 3D printing is impossible through sound or the display.

The sound or display may be implemented integrally with the workstation 200 or may be provided as a separate device.

Figure 11A:
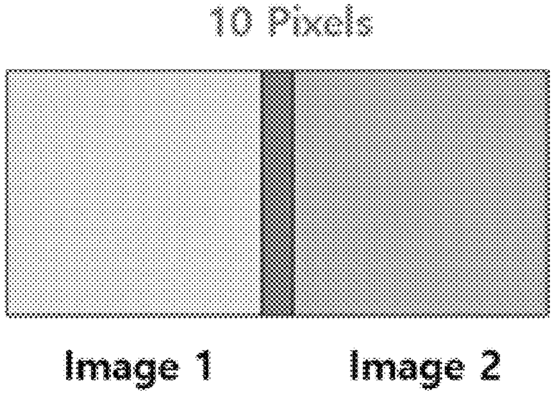
FIGS. 11A and 11B are views for explaining a case where pixels overlap.
Figure 11B:
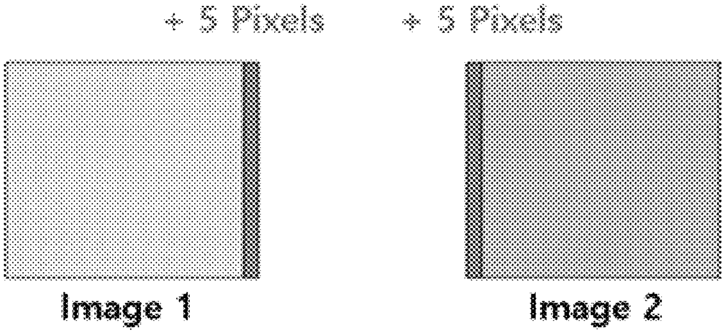

FIGS. 11A and 11B for explaining a case where pixels overlap.

As shown in FIGS. 11A and 11B, when the image 1 and the image 2 overlap by 10 pixels (FIG. 11A), the controller 220 may increase the number of pixels of the image 1 and the image 2 by 5 pixels, respectively (FIG. 11B).

That is, the controller 220 may adjust the pattern image itself by increasing each pixel in order to prevent deformation of the final output with respect to the overlapping portion of the plurality of images.

Accordingly, the controller 220 may adjust the number of pattern images for each output again based on the number of overlapping pixels of each divided pattern.

The communicator 230 may transmit an open signal for opening the shutters 170 as many as the number of outputs to the 3D printer 100.

The 3D printer 100 opens the shutters 170 in response to the number of outputs by the open signal (S340).

Step S340 has already been described in step S120 of FIG. 8, and thus a redundant explanation thereof will be omitted.

The controller 220 adjusts the gray scale level for each pixel (S350).

Figure 12:
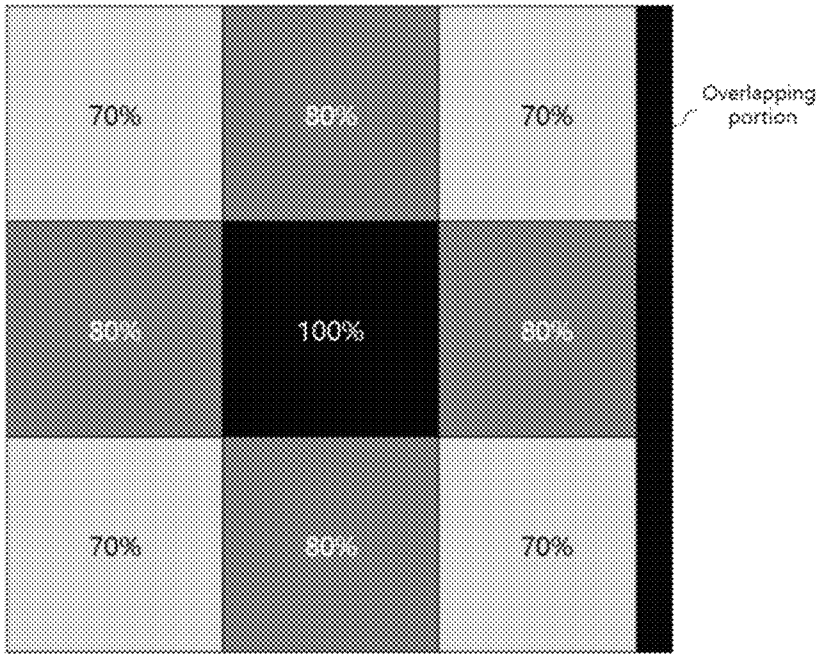
FIG. 12 is a view for explaining a process of adjusting a gray scale level of an overlapping portion.

FIG. 12 is a view for explaining a process of adjusting a gray scale level of an overlapping portion.

As shown in FIG. 12, since the 3D printer 100 emits double UV rays to the overlapped portion, the controller 220 may apply a level at which the intensity of light is twice less than the previously allocated gray scale level.

In other words, the controller 220 may adjust the light intensity once adjusted through the ND filter 160 once more through the gray scale level.

Since step S350 has already been described in the control unit 220 of FIG. 1 and FIG. 7, a redundant explanation thereof will be omitted.

The communicator 230 transmits a printing signal for irradiating a pattern image and an open and close signal of the shutter 170 to the 3D printer 100.

When the UV light emitted from the UV projector 110 is irradiated to the pattern image, the 3D printer 100 may perform 3D printing while the shutter 170 is sequentially opened and closed according to the pattern irradiation position (S360).

For example, it is assumed that one pattern is divided into a total of four divisions of (1-1) to (1-4) and four-divided large-area output is performed.

When a total of four patterns [(1-1), (1-2), (1-3), (1-4)] are irradiated to one pattern, the first layer of the large-area output is output while the shutter 170 is sequentially opened and closed according to the pattern irradiation position, and in this way, the last layer of the other patterns may be repeated.

That is, the 3D printer 100 may perform 3D printing by irradiating the UV light to the pattern image while the shutter 170 sequentially opens and closes the pattern image according to the number of divisions of one pattern image.

Figure 13:
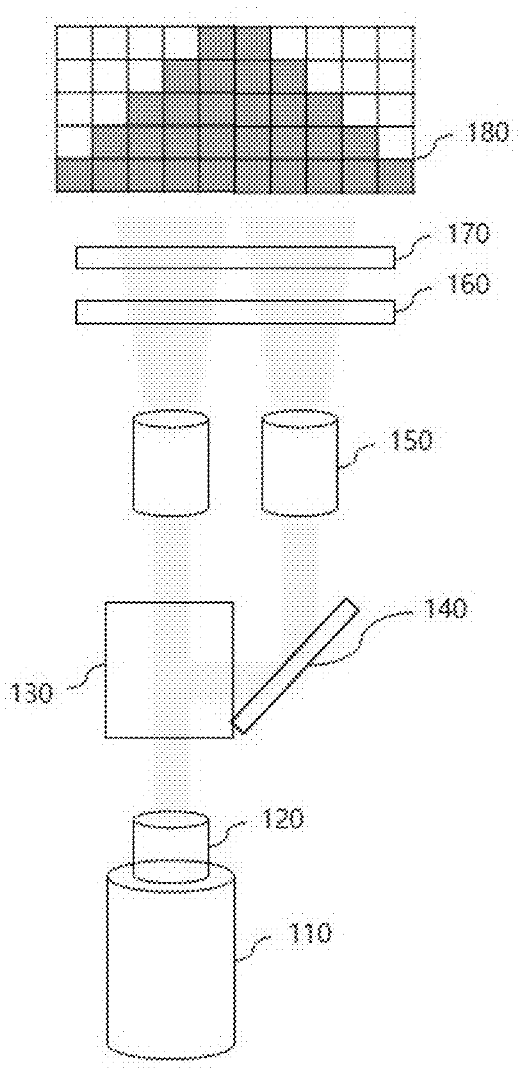
FIG. 13 is a view for describing a high resolution-large area output result according to still another embodiment of the present disclosure.

FIG. 13 is a view for describing a high resolution-large area output result according to still another embodiment of the present disclosure.

As shown in FIG. 13, the 3D printer 100 may perform large-area output by radiating one divided pattern.

As described above, according to the exemplary embodiments of the present invention, the plurality of beam splitters and mirrors are installed between the objective lens and the tube lens, thereby making it possible to generate the same output by simultaneously illuminating the same UV pattern, the UV pattern to be illuminated and the shutter are rapidly changed to sequentially output various patterns, thereby enabling customized mass production, and the interval between the beam splitters and the mirrors is precisely installed to enable large area output while maintaining high resolution.

Those skilled in the art pertaining to the embodiments of the present invention would understand that variations may be implemented in forms modified within the scope of the essential characteristics disclosed herein. Therefore, the disclosed methods should be considered from an illustrative rather than limiting perspective. The scope of the invention is defined by the claims and encompasses all variations falling within the scope equivalent to the invention, rather than the detailed description of the invention itself.

What is claimed is:

1. A method for controlling a 3D printing system comprising a 3D printer comprising a single UV projector to irradiate UV light, a plurality of beam splitters to disperse the irradiated UV light, a plurality of mirrors to reflect the dispersed UV light, and a shutter that is open or closed according to the number of outputs that are to be simultaneously output, and a workstation for performing pre-processing and control for 3D printing, the method comprising:

receiving, by the workstation, the number of outputs that are to be simultaneously output in parallel;

opening, by the 3D printer, the shutter according to the number of outputs;

setting, by the workstation, a pattern image;

adjusting, by the workstation, a gray scale level for each pixel with respect to the set pattern image; and 3D printing, by the 3D printer, the pattern image of which the amount of light is adjusted through the gray scale level.

2. The method for controlling a 3D printing system of claim 1, wherein the adjusting the gray scale level for each pixel comprises:

allocating, by the workstation, a relative value according to an amount of UV light, which is previously measured experimental data, for each of a plurality of regions in one section; and adjusting, by the workstation, the gray scale level based on the allocated relative value.

3. The method for controlling a 3D printing system of claim 1, wherein the setting of the pattern image comprises:

receiving, by the workstation, a layer thickness of an output; and determining, by the workstation, a number of pattern images for each output.

4. The method for controlling a 3D printing system of claim 3, wherein the determining the number of pattern images for each output determines, by the workstation, the number of pattern images for each output using a height of the output and a pre-input layer thickness.

5. The method for controlling a 3D printing system of claim 3, further comprising:

rearranging, by the workstation, the pattern images according to a pattern order of the output including the number of pattern images.

6. The method for controlling a 3D printing system of claim 5, wherein the rearranging the pattern images rearranges, by the workstation, the pattern images in order from the first pattern image for each output to the n-th pattern image for each output.

7. The method for controlling a 3D printing system of claim 5, wherein the 3D printing comprises:

3D printing, by the 3D printer, the pattern image of which the amount of light is adjusted by sequentially opening and closing the shutter in accordance with a rearranged pattern order.

8. The method for controlling a 3D printing system of claim 3, further comprising:

calculating, by the workstation, a number of divisions of one patten image based on an output area.

9. The method for controlling a 3D printing system of claim 8, wherein the calculating of the number of divisions comprises:

calculating, by the workstation, a number of horizontal divisions using a number of horizontal pixels of the output area and a number of output horizontal pixels of a section; or calculating, by the workstation, a number of vertical divisions using a number of vertical pixels of the output area and a number of output vertical pixels of a section.

10. The method for controlling a 3D printing system of claim 8, wherein the 3D printing comprises:

3D printing, by the 3D printer, the pattern image of which the amount of light is adjusted by sequentially opening and closing the shutters in accordance with the number of divisions of one pattern image.

* * * * *